US012158159B2

(12) United States Patent
Cipriani et al.

(10) Patent No.: US 12,158,159 B2
(45) Date of Patent: Dec. 3, 2024

(54) COMPRESSOR ARRANGEMENT AND METHOD OF OPERATING A COMPRESSOR

(71) Applicant: NUOVO PIGNONE TECNOLOGIE—S.R.L., Florence (IT)

(72) Inventors: Sergio Cipriani, Florence (IT); Catiuscia Fiumicelli, Florence (IT); Giacomo Pampaloni, Florence (IT)

(73) Assignee: Nuovo Pignone Tecnologie—S.r.l., Florence (IT)

( * ) Notice: Subject to any disclaimer, the term of this patent is extended or adjusted under 35 U.S.C. 154(b) by 331 days.

(21) Appl. No.: 17/597,797

(22) PCT Filed: Jul. 20, 2020

(86) PCT No.: PCT/EP2020/025338
§ 371 (c)(1),
(2) Date: Jan. 24, 2022

(87) PCT Pub. No.: WO2021/018412
PCT Pub. Date: Feb. 4, 2021

(65) Prior Publication Data

US 2022/0235789 A1 Jul. 28, 2022

(30) Foreign Application Priority Data

Jul. 29, 2019 (IT) ........................ 102019000013155

(51) Int. Cl.
*F04D 25/16* (2006.01)
*F04D 29/12* (2006.01)
*F04D 29/14* (2006.01)

(52) U.S. Cl.
CPC .......... *F04D 29/124* (2013.01); *F04D 25/16* (2013.01); *F04D 29/143* (2013.01);
(Continued)

(58) Field of Classification Search
CPC .... C02F 2201/002; E03F 5/22; F04D 29/124; F04D 25/16; F04D 29/143; F04D 29/08;
(Continued)

(56) References Cited

U.S. PATENT DOCUMENTS

2003/0068230 A1 4/2003 Anderson
2012/0006411 A1 1/2012 Kurz et al.
(Continued)

FOREIGN PATENT DOCUMENTS

JP 09060734 A * 3/1997
KR 20180006393 A 1/2018
(Continued)

*Primary Examiner* — Thomas Fink
(74) *Attorney, Agent, or Firm* — Paul Frank + Collins P.C.

(57) ABSTRACT

A compressor arrangement having a main compressor, a piping system containing process gas to be extracted after the shut-down of the main compressor and one or more components emitting or leaking depressurized process gas while the compressor is operating or starting up; the compressor arrangement further comprises one or more collectors arranged to collect the depressurized process gas emitted from said components and an additional compressor fluidly coupled with the piping system and with the collectors in in order to compress the depressurized process gas coming from the components while the compressor is starting up or operating and to compress process gas coming from the piping system after a shut-down of the compressor.

20 Claims, 3 Drawing Sheets

(52) U.S. Cl.
CPC ...... *F05D 2230/72* (2013.01); *F05D 2240/55* (2013.01); *F05D 2260/6022* (2013.01)

(58) Field of Classification Search
CPC ........ F04D 27/005; F04B 41/06; F04B 49/00; F04B 49/007; F05D 2230/72; F05D 2240/55; F05D 2260/6022; F05D 2260/602
See application file for complete search history.

(56) References Cited

U.S. PATENT DOCUMENTS

| | | | | |
|---|---|---|---|---|
| 2020/0271274 | A1 * | 8/2020 | Taylor | F17C 7/02 |
| 2023/0313947 | A1 * | 10/2023 | Gatlin | F17D 5/005<br>137/14 |

FOREIGN PATENT DOCUMENTS

| | | | | | |
|---|---|---|---|---|---|
| RU | 2455530 | C2 | | 7/2012 | |
| RU | 2472043 | C1 | | 1/2013 | |
| WO | 2010/074725 | A2 | | 7/2010 | |
| WO | WO-2015198822 | A1 | * | 12/2015 | F04B 35/01 |
| WO | WO-2023179917 | A1 | * | 9/2023 | |

* cited by examiner

COMPRESSOR ARRANGEMENT AND METHOD OF OPERATING A COMPRESSOR

TECHNICAL FIELD

The subject-matter disclosed herein relates to gas compressor arrangements and to methods for operating a compressor, in particular to an arrangement and a method making use of process gasses containing hydrocarbons such as methane, ethane and butane.

BACKGROUND ART

A compressor arrangement comprises at least a compressor, for example a centrifugal compressor, fluidly connected to a suction duct and a discharge duct. In order to avoid surges in the compressor, the suction duct and the discharge duct are fluidly connected through a recycle duct controlled by an anti-surge valve. The recycle duct creates a loop between the compressor outlet and the compressor inlet and allows protecting the compressor from surge through the anti-surge valve.

In order to perform some maintenance, some repair operations or any other prolonged stop due to plant operations, the compressor is stopped and depressurized. The final portion of the suction duct, the initial portion of the discharge duct and the recycle duct are also depressurized.

A common practice for depressurizing the inner volume of a compressor and the ducts connected to it consists in releasing the process gas directly into the atmosphere or to burn it with a flare stack. However this practice leads to the release of greenhouse gasses in the atmosphere, which constitutes both a loss of a valuable good and an emission of potent greenhouse gasses (for example methane has 28 to 34 more greenhouse power than carbon dioxide over 100 years).

In addition, some compressors currently employed in the industry cause other emissions of hydrocarbon gasses. They may have mechanical dry gas seals which, in order to avoid contact between moving parts, tolerate a slow and constant leakage of process gas which is vented in the atmosphere or flared. Also, dry gas seals of compressors comprise a stand-by filter, which is kept in reserve and ready to replace the operating filter. In order to prevent condensations when the stand-by filter is put into use, the stand-by filter and the gas inside it are kept warm by spilled process gas. The spilled gas is then vented in the atmosphere or flared.

Additionally, compressors are often driven by a gas turbine and the process gas, thanks to its pressure, may also be used to initiate rotation of the gas turbine before starting combustion; in this case, (un-combusted) process gas at the outlet of the turbine is released in the atmosphere or flared.

The gas turbine driving the compressor benefits from heating of the turbine fuel inlet duct prior to startup of the turbine in order to avoid condensation of the propellant. Such heating is also performed by spilling fuel gas, which is vented in the atmosphere or flared afterwards.

SUMMARY

According to an aspect, the subject-matter disclosed herein relates to a compressor arrangement comprising: at least one main compressor having a main inlet and a main outlet; an additional compressor having an additional inlet and an additional outlet; a piping system arranged to supply gas to the main inlet and to collect gas from the main outlet; one or more components emitting depressurized gas, each component having a collector arranged to collect the depressurized gas; wherein the additional inlet is fluidly coupled with one or more of the collectors; and wherein the additional inlet is fluidly coupled with the piping system and arranged to extract gas from the piping system when the main compressor is shut down.

According to another aspect, the subject-matter disclosed herein relates to a method for operating a compressor, comprising the steps of: collecting a depressurized gas from the compressor while the compressor is running or starting up; pumping the depressurized gas into a pressurized duct; shutting the compressor down; collecting a process gas from the compressor while the compressor is not running, and pumping the process gas into the pressurized duct.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
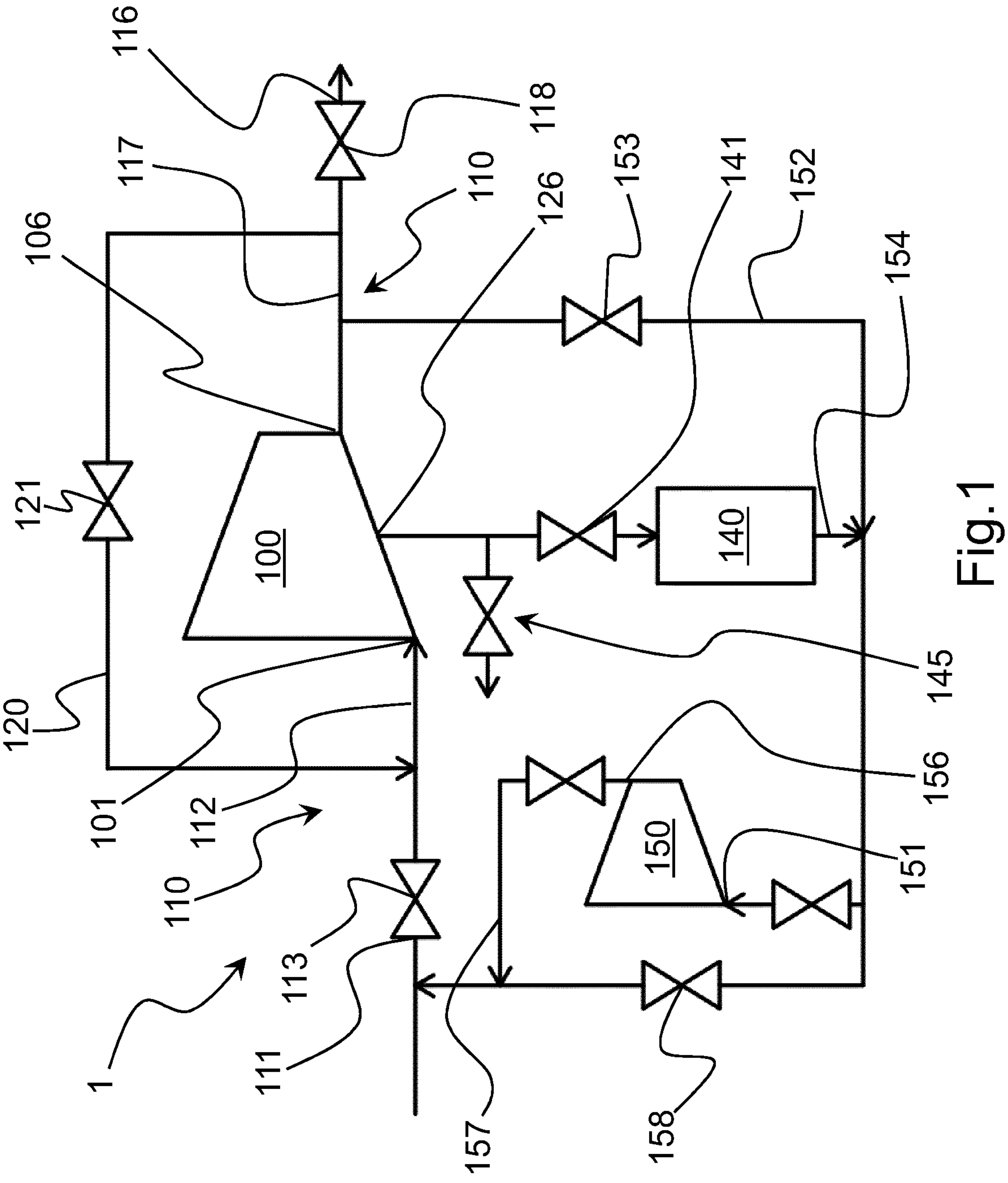
FIG. 1 shows a schematic view of a first embodiment of a compressor arrangement according to the subject-matter disclosed herein.

The subject matter herein disclosed relates to compressor arrangements and a methods of operating a compressor.

A compressor arrangement, in particular for Oil & Gas applications, is arranged to receive a flow of hydrocarbon gas, process it, and discharge it at a higher pressure. In these types of applications, the incoming gas flow is already pressurized upstream of the compressor arrangement, i.e. it is at a high pressure for example at 40 bar. The compressor arrangement processes the incoming gas flow by increases its pressure at an even-higher level, for example at 80 bar.

Such compressor arrangement comprises a main compressor, in particular a centrifugal compressor, and a piping system which is fluidly connected to the inlet and the outlet of the main compressor. The piping system includes at least a suction duct, a discharge duct and preferably a recycle duct arranged to create a loop between the compressor inlet and the compressor outlet.

The compressor arrangement disclosed herein further includes an additional compressor, in particular a reciprocating compressor, fluidly connected to the piping system. During shutdown of the main compressor, the piping system is substantially isolated and a substantial amount of process gas remains trapped in the piping system and inside the main compressor. A purpose of the additional compressor is to pump the process gas out of the piping system after shutdown so that then it is possible to inspect, maintain or repair the main compressor without discharging any substantial amount of process gas into the atmosphere or flaring it.

In particular, the additional compressor is arranged to collect the process gas trapped in the piping system and to pump it in a suction header or a pressurized duct upstream of the piping system. The additional compressor is therefore configured to increase the pressure of the trapped gas up to the pressure inside the suction header (for example 40 bar).

It is another purpose of the additional compressor to recycle depressurized un-combusted gas lost by the compressor arrangement for example through leakage and venting. In fact, one or more components of the compressor arrangement may emit depressurized hydrocarbon gas. For example, the main compressor may have mechanical dry gas seals which, while operating, cause by design a continuous leakage of process gas and are therefore a source of depressurized gas. In addition, such dry gas seals may comprise filters which are preferably kept warm while not operating. In order to keep the non-operating filters and the gas they contain warm, the compressor assembly may comprise a spilled gas system which circulates (warm) process gas inside the filter of the main compressor and constitutes an additional source of depressurized gas.

According to some embodiments, the compressor arrangement comprises a gas turbine driving the main compressor and other components, related to the gas turbine, emitting depressurized gas. For example, the gas turbine may have a pneumatic starter which employs (pressurized) process gas for starting the gas turbine and emits depressurized gas. Additionally, the gas turbine has a fuel duct which requires heating prior to starting up the turbine to prevent condensation in the gas fuel. Such heating may be accomplished by flowing (warm) process gas, which is then emitted as depressurized gas.

In order to prevent the depressurized gas to be discharged or flared into the atmosphere, the compressor arrangement comprises one or more collectors arranged to collect the depressurized gas emitted from one or more of the above-mentioned components. Such collector is fluidly coupled with the additional compressor in order to pressurize and recycle the collected depressurized gas.

According to preferred embodiments, the compressor arrangement comprises an accumulation vessel positioned downstream of the collector in order to store the depressurized gas collected from the gas emitting components and the additional compressor is fluidly connected with the accumulation vessel.

The accumulation vessel and the additional compressor can be sized and configured to perform the task of emptying the piping system in a predetermined amount of time after the shutdown of the main compressor. The additional compressor configured in such way is oversized for the task of recycling the depressurized gas during the operation of the main compressor resulting from leakages. The accumulation vessel allows the additional compressor the work in intermittent runs and the depressurized gas is stored in the accumulation vessel between the runs.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When introducing elements of various embodiments the articles "a", "an", "the", and "said" are intended to mean that there are one or more of the elements. The terms "comprising", "including", and "having" are intended to be inclusive and mean that there may be additional elements other than the listed elements.

According to one aspect and with reference to FIG. 1, the subject-matter disclosed herein provides a compressor arrangement 1. The compressor arrangement 1 is arranged to be used in Oil & Gas applications and is configured receive a flow of hydrocarbon gas at a pressure higher than atmospheric pressure, for example 40 bar, process it, and discharge it at a pressure higher than the suction pressure, for example 80 bar.

The compressor arrangement 1 comprises at least one main compressor 100, in particular a centrifugal compressor. Depending on the design requirements of the compressor arrangement 1, the latter may comprise two or more main compressors 100, arranged in series and/or in parallel.

The main compressor 100 has a main inlet 101 arranged to receive a flow of hydrocarbon gas to be processed and a main outlet 106 arranged to discharge the processed flow. The main compressor 100 further comprises one or more mechanical seals 125, in particular a dry gas seal, interposed between the shaft and the outer body of the main compressor 100 itself.

Such dry gas seals rely on continuous gas spilling from the main compressor 100 in order to maintain a buffer of flowing gas between its moving parts. The mechanical seal 125 has a gas inlet arranged to collect spilled process gas from the compressor arrangement 1 and a gas outlet arranged to emit leakage depressurized gas. Inside the seal, the gas flows from the gas inlet to the gas outlet and creates buffer between its moving parts. Preferably, the mechanical seals 125 comprise a collector 126 arranged to collect the depressurized gas emitted at the gas outlet. With the expression "depressurized gas" it is intended gas containing hydrocarbons emitted at a pressure lower than the pressure of the process gas upstream of the main compressor 100.

The compressor arrangement 1 further comprises filters for the buffer gas upstream of the mechanical seals 125 in order to prevent liquids, particles and other solid matter having a diameter above a predetermined limit from entering the seal and deteriorating it. At least one operational filter is used for filtering the buffer gas while at least one clean stand-by filter is kept in reserve to be switched with the operational filter in order to avoid a stop of the main compressor 100 when the operational filter is dirty. The compressor arrangement 1 comprises a stand-by filter warm-up system 127 arranged to warm-up the filter kept in reserve with spilled process gas, which has a temperature comprised between 70° C. and 95° C. The stand-by filter warm-up system 127 is configured to keep the gas inside the stand-by filter warm in order to avoid condensations when the stand-by filter is activated. The spilled gas is emitted by the stand-by filter warm-up system 127 after circulation in the stand-by filter and constitutes another source of leaked depressurized gas. The stand-by filter warm-up system 127 preferably comprises a collector 128 arranged to collect the depressurized gas downstream of the stand-by filter.

The main compressor 100 is fluidly coupled with a piping system 110 arranged to supply gas to the main inlet 101 and to collect gas from the main outlet 106. The piping system 110 has a system inlet 111 configured for a fluid connection with an upstream gas source and a system outlet 116 configured for a fluid connection with a downstream gas receiving device. A suction header may be arranged at the system inlet and a discharge header may be arranged at the system outlet. The piping system 110 comprises an inlet duct 112 extending from the system inlet 111 to the main inlet 101 and an outlet duct 117 extending from the main outlet 106 to the system outlet 116. A suction isolation valve 113 is positioned at the system inlet 111 and is arranged to open or close a fluid connection between the inlet duct 112 and the upstream gas source. A discharge isolation valve 118 is positioned at the system outlet 116 and is arranged to open or close a fluid connection between the outlet duct 117 and the downstream gas receiving device.

The piping system 110 further comprises at least one return duct 120 fluidly connecting the main outlet 106 with the main inlet 101. An anti-surge valve 121 is installed in the return duct 120 and is arranged to control a recycle flow through the return duct 120 in order to prevent surges in the main compressor 100 and/or to equalize the pressures in case of an emergency shutdown.

Figure 2:
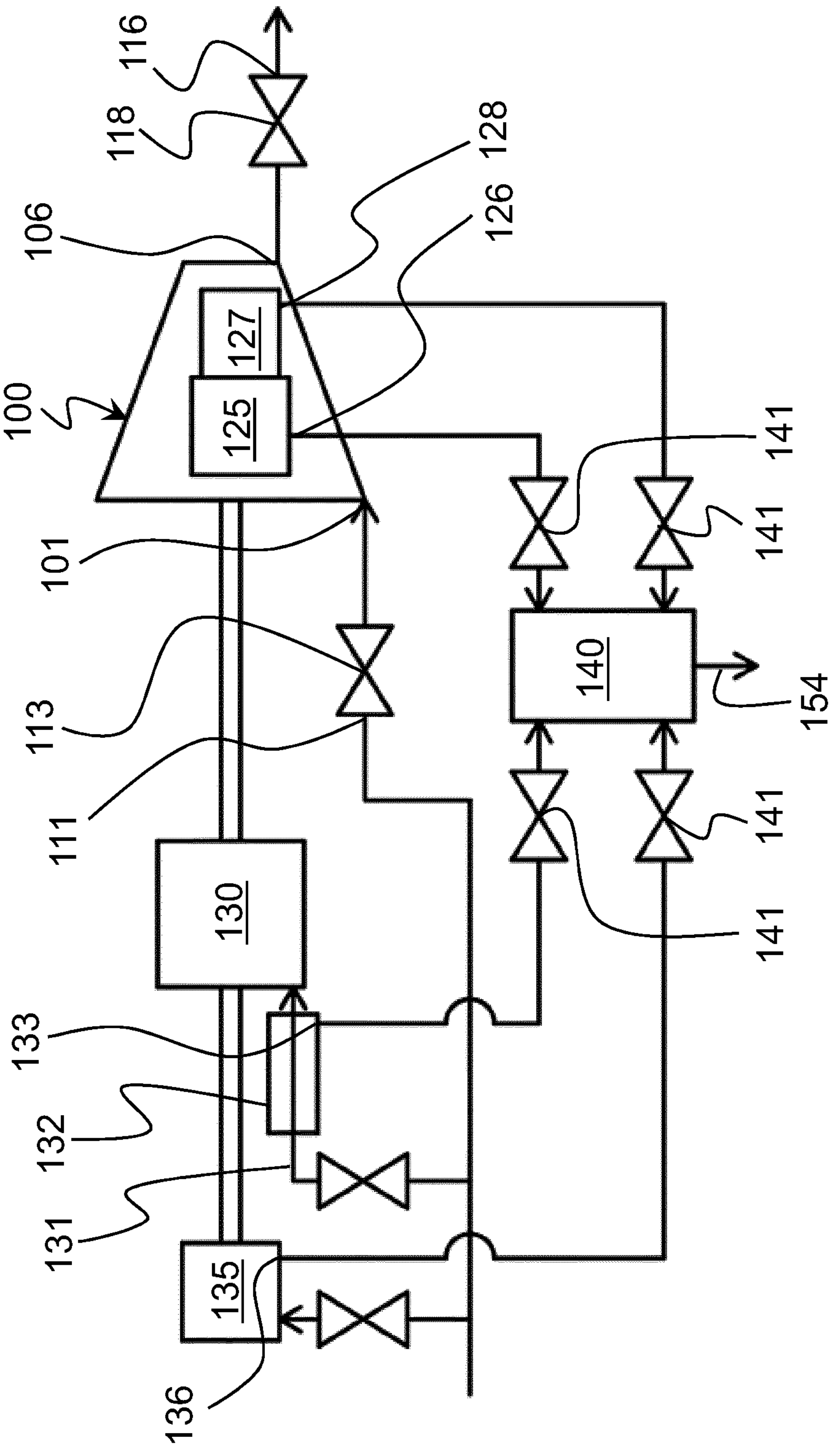
FIG. 2 shows a schematic view of a second embodiment of a compressor arrangement according to the subject-matter disclosed herein, wherein some elements are not shown for simplicity.

As shown in FIG. 2, the compressor arrangement 1 further comprises a driver arranged to drive the main compressor 100. In a preferred embodiment, the driver is a gas turbine 130 mechanically coupled with the main compressor 100. A fuel duct 131 is fluidly coupled with the gas turbine 130 and arranged to supply the gas turbine 130 with fuel gas. In the embodiment of FIG. 2, the fuel duct 131 is arranged to draw process gas from the piping system 110 or upstream of the system inlet 111 in order to use it as fuel gas. In a possible alternative embodiment, the source of the fuel gas of the gas turbine 130 is different from the process gas.

Preferably, the compressor arrangement 1 comprises a heating system 132 arranged to circulate spilled process or fuel gas in the fuel duct 131 prior to a start-up of the gas turbine 130. The heating system 132 prevents condensation of the fuel gas at entering the gas turbine 130 caused by convection with the fuel duct 131 itself. Such spilled gas constitutes a source of depressurized gas and the heating system 132 preferably comprises a collector 133 arranged to collect it.

In a possible embodiment, also shown in FIG. 2, the compressor arrangement 1 further comprises a pneumatic starter 135 for the gas turbine 130. The pneumatic starter 135 is arranged to collect process gas (which is pressurized normally at around 40 bar) and convert its pressure into mechanical energy for spinning the gas turbine 130 during its start-up. The pneumatic starter 135 emits depressurized gas during the start-up of the gas turbine 130 and comprises a collector 136 arranged to collect such depressurized gas.

The annexed FIG. 1, shows an embodiment of the compressor arrangement 1 having only the collector 126 for collecting depressurized gas from the mechanical seal 125 of the main compressor 100.

The annexed FIG. 2 shows an embodiment of the compressor arrangement 1 comprising: the collector 126 for collecting depressurized gas from the mechanical seal 125, the collector 128 for collecting depressurized gas from the stand-by filter warm-up system 127, the collector 133 for collecting depressurized gas from the heating system 132 and the collector 136 for collecting depressurized gas from the pneumatic starter 135. In FIG. 2 some components such as the return duct 120 and the additional compressor 150 have been omitted for simplicity.

Preferably, the compressor arrangement 1 comprises an accumulation vessel 140 fluidly coupled with one or more of the collectors described above in order to receive and store the depressurized gas flowing from the components emitting it. The compressor arrangement 1 may comprise other collectors fluidly coupled with the accumulation vessel 140 and arranged to collect depressurized gas emitted from any component of the compressor arrangement 1.

In the embodiment of FIG. 1 the accumulation vessel 140 is fluidly coupled with the collector 126 through a duct having a collector valve 141 that can be opened and closed. In the embodiment of FIG. 2 the accumulation vessel 140 is fluidly coupled with the collectors 126, 128, 133 and 136 through respective ducts having respective collector valves 141. In an alternative possible embodiment, the compressor arrangement 1 comprises multiple accumulation vessels, each fluidly coupled to a respective collector for depressurized gas. The accumulation vessel 140 is essentially a tank having an inner chamber for storing gas at pressures between 1 bar and 20 bar, preferably between 1 bar and 5 bar. Preferably, the accumulation vessel 140 has a storing volume comprised between 3 $m^3$ and 500 $m^3$. More preferably, the accumulation vessel 140 has a storing volume comprised between 5 $m^3$ and 30 $m^3$.

The compressor arrangement 1 further comprises an additional compressor 150, preferably a reciprocating compressor, having an inlet for receiving gas hereby called "additional inlet 151" and an outlet for emitting gas hereby called "additional outlet 156".

The additional inlet 151 is fluidly coupled with the piping system 110 through a first duct 152 which houses a piping valve 153 which can be opened and closed. Alternatively, the additional inlet 151 may be fluidly coupled with the inner chamber of the main compressor 100, which also fluidly communicates with the piping system 110.

The additional inlet 151 is also fluidly coupled with the accumulation vessel 140 thorough a second duct 154. A valve may be installed in the second duct 154 for opening and closing it.

By selecting the position of the collector valve(s) 141 and the piping valve 153, the additional compressor 150 may be configurable to receive gas from the accumulation vessel 140 or from the piping system 110.

An atmospheric vent 145 controlled by a valve is fluidly coupled with the collector(s) and configured to release the depressurized gas in the atmosphere when the accumulation valves 141 are closed, which can happen when the piping valves 153 are open because the additional compressor 150 is extracting fluid from the piping system 110. An additional venting valve (not illustrated in the attached drawings) may be fluidly coupled with the piping system 110 and arranged to release in the atmosphere the gas contained in the piping system 110 and in the main compressor 100. Such additional valve may be opened in case there is a need to depressurize the compression arrangement 1 and the piping valve 153 cannot be opened or the additional compressor 150 cannot be activated. A flare stack may be arranged to burn flammable gasses released by the atmospheric vent 145 and/or by the additional venting valve.

The additional outlet 156 of the additional compressor 150 is either fluidly coupled with the system inlet 111 upstream of the suction isolation valve 113 or with the system outlet 116 downstream of the discharge isolation valve 118. In the embodiment of FIG. 1, which is preferred due to the lower pressure upstream of the compressor arrangement 1, the additional outlet 156 is fluidly coupled with the system inlet 111 through a connecting duct 157.

The additional compressor 150 is able to extract the process gas trapped in the piping system 110 after the main compressor 100 is shut down and the suction and discharge isolation valves 113 and 118 have been closed. Such gas is then pumped upstream or downstream of the piping system 110 and is prevented from being released or flared into the atmosphere.

Preferably, the additional compressor 150 is configured to extract the gas from the piping system 110 in order to lower the pressure in the piping system 110 from an operating pressure of around 60 bar (at the shutdown of the main compressor 100) to a final pressure equal or lower than 10 bar, preferably equal or lower than 3 bar, in an interval of time comprised between 15 minutes and 20 hours, preferably between 2 hours and 10 hours. In a preferred embodiment, the additional compressor 150 has a power comprised between 10 kW and 150 kW and a flow rate comprised between 100 $Nm^3$/hr and 2000 $Nm^3$/hr.

The additional compressor 150 configured as described above is able to extract the depressurized gas accumulated in the accumulation vessel 140 and to pump it upstream or downstream of the piping system 110 during the operation of the main compressor 100, thereby preventing the release of the depressurized gas into the atmosphere.

In a possible embodiment, the accumulation vessel 140 is fluidly coupled with the piping system 110 through a valve and can be arranged to receive gas from the piping system 110 after the shutdown of the compressor 100, before extracting the gas through the additional compressor 150.

The additional compressor 150 configured as described is oversized for the continuous pumping of depressurized gas, therefore the accumulation vessel 140 allows the temporary accumulation of depressurized gas so that the additional compressor 150 can be activated intermittently to empty the accumulation vessel 140 when it has reached a certain pressure.

Preferably, the compressor arrangement 1 comprises a control unit configured to turn on and off the additional compressor 150 in order to maintain the pressure in the accumulation vessel 140 between a minimum predetermined value, for example 1.1 bar, and a maximum predetermined value. The maximum predetermined value is preferably lower than 20 bar and even more preferably lower than 6 bar. In a preferred embodiment the maximum predetermined value is around 3 bar.

In an alternative embodiment of the compressor arrangement 1, the compressor arrangement 1 doesn't have an accumulation vessel 140 and the additional inlet 151 is directly connected with one or more of collectors 126, 128, 133 and 136. Preferably, in this embodiment the additional compressor 150 is a variable speed compressor which is able to adapt its flow rate to the rate of the emissions of depressurized gas and is also able to provide the required flow rate to empty the piping system 110 in an interval of time comprised between 15 minutes and 20 hours, preferably between 2 hours and 10 hours.

Preferably, the compressor arrangement 1 further comprises a by-pass valve 158 fluidly coupling the additional inlet 151 with the additional outlet 156, which allows to by-pass the additional compressor. Such by-pass valve 158 may be opened when, after shutting off the main compressor 100, the gas pressure upstream of the suction isolation valve 113 is lower than the pressure in the piping system 110. This allows the process gas to naturally flow outside of the piping system 110.

Figure 3:
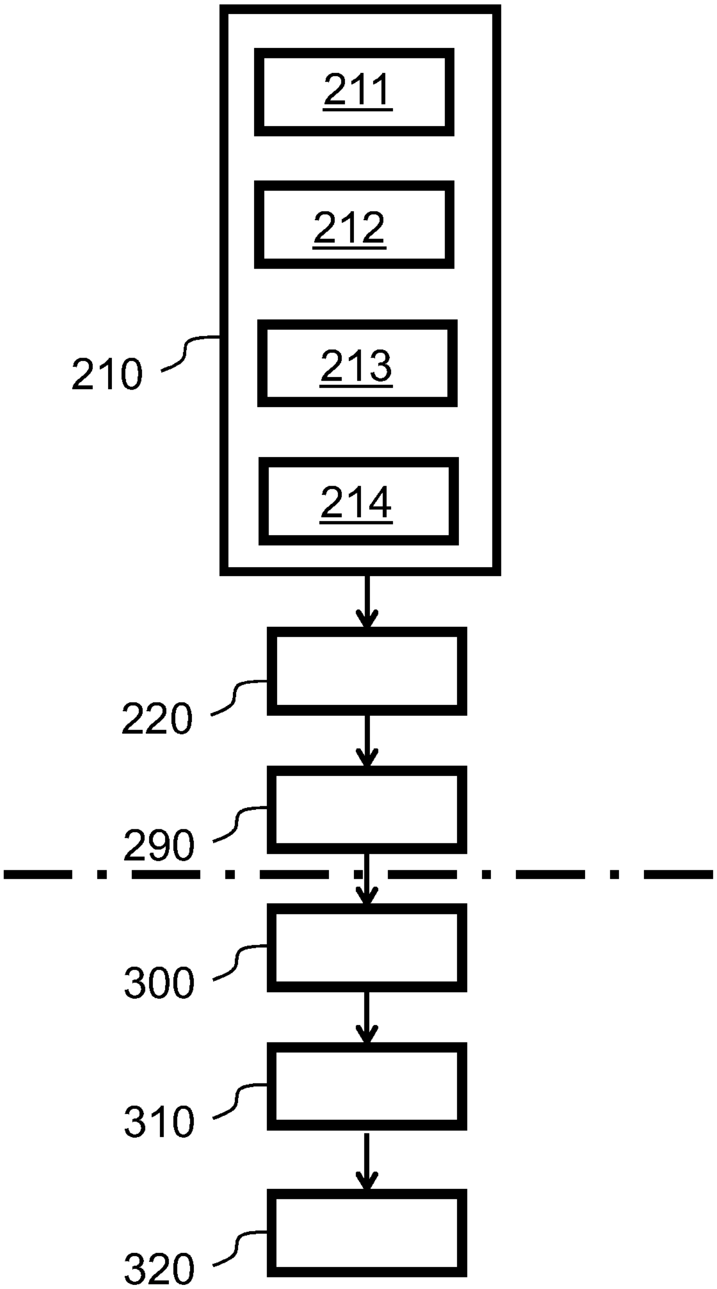
FIG. 3 shows a flow chart of an embodiment of a control method according to the subject-matter described herein.

According to a second aspect and with reference to FIG. 3, the subject-matter disclosed herein provides a method for operating a compressor, in particular for operating the main compressor 100 of the compressor arrangement 1.

While the compressor 100 is running or starting up, the method comprises a step A1 (block 210 in FIG. 3) of collecting a depressurized gas, in particular the depressurized gas collected by the collectors 126, 128, 133 and 136 respectively of the embodiment of FIG. 2.

Preferably, step A1 (block 210 in FIG. 3) comprises one or more of the following sub-steps.

A11) (block 211 in FIG. 3) Collecting depressurized buffer gas from a mechanical seal 125 of the compressor 100, in particular through the collector 126.

A12) (block 212 in FIG. 3) Collecting spilled gas used for warming up the gas volume inside a filter of a mechanical seal 125 of the compressor 100, in particular through the collector 128.

A13) (block 213 in FIG. 3) Collecting depressurized gas from a pneumatic starter 135 of a gas turbine 130 driving the compressor 100 during a start-up of the gas turbine 130, in particular through the collector 136.

A14) (block 214 in FIG. 3) Collecting spilled gas used for heating a fuel duct 131 of a gas turbine 130 driving the compressor 100, in particular through the collector 133.

Preferably, step A1 (block 210 in FIG. 3) further comprises accumulating the depressurized gas inside an accumulation vessel 140.

The method further comprises step A2 (block 220 in FIG. 3) of pumping the depressurized gas into a pressurized duct, in particular to a duct fluidly coupled with the piping system 110 described above, preferably upstream of the suction isolation valve 113. Preferably, step A2 (block 220 in FIG. 3) comprises pumping the depressurized gas out of the accumulation vessel 140 after the pressure in the accumulation vessel 140 has reached a maximum predetermined value. The maximum predetermined value is preferably equal or lower than 20 bar and even more preferably equal or lower than 6 bar. Preferably, the step A2 (block 220 in FIG. 3) is performed through a reciprocating compressor, in particular through the additional compressor 150 described above.

The method further comprises a step A9 (block 290 in FIG. 3) of shutting the compressor 100 down. After the shutdown of the compressor 100, the method comprises a step B0 (block 300 in FIG. 3) of sealing the suction isolation valve 113 and the discharge isolation valve 118.

After step B0 (block 300 in FIG. 3), the method comprises a step B1 (block 310 in FIG. 3) of collecting a process gas from the compressor 100, in particular from the piping system 110. In a preferred embodiment, step B1 (block 310 in FIG. 3) is performed through the first duct 152 described above.

The method further comprises a step B2 (block 320 in FIG. 3) of pumping the process gas into the pressurized duct, performed by the same reciprocal compressor as step A2 (block 320 in FIG. 3). In a possible embodiment, the process gas coming from the piping system 110 may be temporarily stored in the accumulation vessel 140 prior to being pumped into the pressurized duct.

The invention claimed is:

1. A compressor arrangement comprising:

at least one main compressor having a main inlet and a main outlet;

an additional compressor having an additional inlet and an additional outlet;

a piping system arranged to supply process gas to the main inlet one or more components emitting depressurized gas, each component having a collector arranged to collect the depressurized gas;

wherein the additional inlet is fluidly coupled with one or more of said collectors and arranged to receive depressurized gas from one or more of said; and wherein the additional inlet is fluidly coupled with the piping system and arranged to extract process gas from the piping system after shut-down of the main compressor.

2. The compressor arrangement of claim 1, wherein one of said components is a mechanical seal having a gas inlet and a gas outlet, said mechanical seal being arranged to collect spilled process gas at the gas inlet and emit depressurized gas at the gas outlet, a gas flow between the gas inlet and the gas outlet forming a buffer between moving parts, the collector of the mechanical seal being arranged to collect depressurized gas from said gas outlet.

3. The compressor arrangement of claim 1, further comprising:

a mechanical seal, in particular a dry gas seal, having at least one mounted filter for buffer gas and at least one stand-by filter, and wherein one of said components is a stand-by filter warm up system configured to warm up said at least one stand-by filter with spilled gas, the collector of the stand-by filter warm up system being arranged to collect depressurized gas from said stand-by filter warm-up system.

4. The compressor arrangement of claim 1, further comprising:

a gas turbine arranged to drive the main compressor;

wherein one of said components emitting depressurized gas is a pneumatic starter for the gas turbine, the collector of the pneumatic starter being arranged to collect depressurized gas emitted from the pneumatic starter during start-up of the gas turbine.

5. The compressor arrangement of claim 1, further comprising:

a gas turbine arranged to drive the main compressor;

a fuel duct fluidly coupled with the gas turbine and arranged to supply the gas turbine with fuel gas;

wherein one of said components emitting depressurized gas Is a heating system arranged to circulate fuel gas in the fuel duct prior to start-up of the gas turbine, the collector of the heating system being arranged to collect depressurized gas emitted by the heating system while heating the fuel duct.

6. The compressor arrangement of claim 1, further comprising:

an accumulation vessel, fluidly coupled with one or more of said collectors and with the additional inlet, said additional compressor being arranged to pump gas out of said accumulation vessel.

7. The compressor arrangement of claim 6, wherein the accumulation vessel has a volume comprised between 3 $m^3$ and 500 $m^3$, preferably between 5 $m^3$ and 30 $m^3$.

8. The compressor arrangement of claim 6, further comprising:

a control unit configured to turn on and off said additional compressor in order to maintain a pressure in the accumulation vessel between a minimum predetermined value and a maximum predetermined value, said maximum predetermined value being preferably lower than 20 bar, more preferably lower than 6 bar.

9. The compressor arrangement of claim 1, wherein the additional compressor is a reciprocating compressor.

10. The compressor arrangement of claim 1, wherein the additional compressor is configured to extract gas from the piping system during shutdown of the main compressor in order to lower the pressure in the piping system from an operating pressure of the piping system to a shutdown pressure, said shutdown pressure being preferably lower than 10 bar and more preferably lower than 3 bar.

11. The compressor arrangement of claim 10, wherein the additional compressor is configured to lower the pressure in the piping system from the operating pressure to the shutdown pressure in an interval of time comprised between 15 minutes and 20 hours, preferably between 2 hours and 10 hours.

12. The compressor arrangement of claim 1, further comprising:

a piping valve fluidly coupling the additional inlet with the piping system; and a collector valve fluidly coupling the additional inlet with the one or more collectors.

13. The compressor arrangement of claim 1, wherein the piping system has a system inlet fluidly coupled with the main inlet and a system outlet fluidly coupled with the main outlet, the compressor arrangement further comprising:

a suction isolation valve arranged at the system inlet to selectively seal the system inlet; and a discharge isolation valve arranged at the system outlet to selectively seal the system outlet.

14. The compressor arrangement of claim 13, wherein the additional outlet is fluidly coupled with the system inlet upstream of the suction isolation valve or the additional outlet is fluidly coupled with the system outlet downstream of the discharge isolation valve.

15. The compressor arrangement of claim 1, further comprising:

a by-pass valve fluidly coupling the additional inlet with the additional outlet.

16. A method of operating a compressor, comprising the steps of:

A1) collecting a depressurized gas from the compressor and/or a component operatively coupled with the compressor while the compressor is running or starting up;

A2) pumping said depressurized gas into a pressurized duct;

A9) shutting the compressor down;

B1) collecting a process gas from the compressor while the compressor is not running, and B2) pumping said process gas into said pressurized duct.

17. The method of claim 16, wherein step A1 comprises one or more of the following sub-steps:

A11) collecting a depressurized buffer gas from a mechanical seal of the compressor;

A12) collecting spilled gas used for warming up the gas volume inside a filter of a mechanical seal of the compressor;

A13) collecting depressurized gas from a pneumatic starter of a gas turbine driving the compressor during a start-up of the gas turbine;

A14) collecting spilled gas used for heating a fuel duct of a gas turbine driving the compressor.

18. The method of claim 16, wherein step A1 comprises accumulating the depressurized gas inside an accumulation vessel, and step A2 comprises pumping said depressurized gas out of the accumulation vessel after the pressure in the accumulation vessel has reached a predetermined value.

19. The method of claim 16, wherein step A2 is performed through a reciprocating compressor and step B2 is performed through the same reciprocating compressor.

20. The method of claim 16, wherein said method comprises a step B0 of sealing a suction isolation valve fluidly coupled with an inlet of said compressor and of sealing a discharge isolation valve fluidly coupled with an outlet of said compressor, to be performed after step A9 and prior to step B1, said pressurized duct being fluidly coupled with the suction isolation valve upstream of the suction isolation valve or said pressurized duct being fluidly coupled with the discharge isolation valve downstream of the discharge isolation valve.

* * * * *